(12) United States Patent
Galezer et al.

(10) Patent No.: US 10,503,682 B1
(45) Date of Patent: Dec. 10, 2019

(54) ACCESSING PCIE CONFIGURATION DATA THROUGH NETWORK

(71) Applicant: Mellanox Technologies, Ltd., Yokneam (IL)

(72) Inventors: Yoni Galezer, Haifa (IL); Lavi Koch, Tel Aviv (IL); Tova Bar Asher, Rehovot (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 0 days.

(21) Appl. No.: 16/224,833

(22) Filed: Dec. 19, 2018

(51) Int. Cl.
*G06F 13/42* (2006.01)
*G06F 13/38* (2006.01)
*H04L 12/931* (2013.01)

(52) U.S. Cl.
CPC ........ *G06F 13/4221* (2013.01); *G06F 13/382* (2013.01); *H04L 49/358* (2013.01); *G06F 2213/0026* (2013.01); *G06F 2213/3808* (2013.01)

(58) Field of Classification Search
CPC .............. G06F 13/385; G06F 13/4022; G06F 2213/0026
See application file for complete search history.

(56) References Cited

U.S. PATENT DOCUMENTS

| | | | | |
|---|---|---|---|---|
| 6,553,439 B1* | 4/2003 | Greger | ................ | G06F 13/4291 710/11 |
| 7,752,376 B1* | 7/2010 | Johnsen | .............. | G06F 13/4022 710/10 |
| 7,836,238 B2 | 11/2010 | Freimuth et al. | | |
| 7,934,032 B1 | 4/2011 | Sardella et al. | | |
| 8,443,126 B2 | 5/2013 | Elboim | | |
| 8,832,499 B2* | 9/2014 | Saghi | .................... | G06F 9/4411 714/30 |
| 9,842,075 B1* | 12/2017 | Davis | .................... | G06F 13/385 |
| 9,910,690 B2* | 3/2018 | Williamson | ........ | G06F 9/45558 |
| 10,031,857 B2* | 7/2018 | Menachem | ............. | G06F 13/28 |
| 10,114,658 B2* | 10/2018 | Huang | .................. | G06F 9/4411 |
| 2002/0133662 A1 | 9/2002 | Cheung | | |
| 2011/0320652 A1* | 12/2011 | Craddock | ............... | G06F 9/468 710/64 |
| 2012/0260015 A1 | 10/2012 | Gay et al. | | |
| 2014/0201401 A1 | 7/2014 | Tokumitsu | | |
| 2015/0324312 A1 | 11/2015 | Jacobson et al. | | |

(Continued)

OTHER PUBLICATIONS

Intel® Xeon® Processor C5500/C3500 Series Datasheet—vol. 1, 520 pages, Feb. 2010.

(Continued)

*Primary Examiner* — Brian T Misiura
(74) *Attorney, Agent, or Firm* — Kligler & Associates (57) ABSTRACT

A network adapter includes one or more ports for communicating over a communication network, a bus interface, and logic circuitry. The bus interface is configured to communicate over a bus. The logic circuitry is configured to receive bus configuration request packets from an originator, to control the bus interface to generate one or more bus configuration cycles in response to at least some of the bus configuration request packets, and, in response to the bus configuration cycles, to generate and send bus configuration response packets to the originator of the bus configuration request packets.

8 Claims, 6 Drawing Sheets

(56) References Cited

U.S. PATENT DOCUMENTS

| | | | |
|---|---|---|---|
| 2016/0077976 A1* | 3/2016 | Raikin | G06F 13/28 |
| | | | 711/207 |
| 2016/0170918 A1 | 6/2016 | Butcher et al. | |
| 2017/0068630 A1 | 3/2017 | Iskandar et al. | |
| 2017/0371382 A1 | 12/2017 | Searby | |

OTHER PUBLICATIONS

Intel.,"Hot-Plug Capability of NVMe SSDs in Server Platforms", White paper, Hot Plug Guidance, 2 pages, 2016.
"PCI Express® Base Specification," Revision 4.0, version 1.0, 1293 pages, Sep. 27, 2017.
Itkin et al., U.S. Appl. No. 16/039,386, filed Jul. 19, 2018.
U.S. Appl. No. 16/039,386 office action dated Mar. 20, 2019.

* cited by examiner

Pcie configuration cycle header layout

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 > | Fmt 0x0 | | | Type | | | | | T 9 | TC 0 0 0 | | | T 8 | Attr R | L N | T H | E P | Attr | | AT | | Length 0 0 0 0 0 0 0 0 0 1 | | | | | | | | | |
| Byte 4 > | Requester ID | | | | | | | | | | | | | | | | Tag | | | | | | | | Last DW BE 0 0 0 0 | | | | 1st DW BE 0 0 0 1 | | | |
| Byte 8 > | Bus Number | | | | | | | | Device Number | | | | | Function Number | | | Reserved | | | | | | | | Ext. Reg. Number | | | | Register Number | | | R |

ACCESSING PCIE CONFIGURATION DATA THROUGH NETWORK

FIELD OF THE INVENTION

The present invention relates generally to communication networks, and particularly to remote accessing of internal busses of nodes in the communication networks.

BACKGROUND OF THE INVENTION

Elements of a communication network, such as switches and servers, typically comprise a plurality of units, interconnected by fast buses, such as Peripheral Component Interconnect Express (PCIe). The PCIe configuration is typically stored in a configuration space, which is read from and written into using PCIe Configuration cycles. This process is defined in "PCIe Express Bus Specifications," Revision 4.0, Version 0.9, May 31, 2017, chapter 2.2.7, which is incorporated herein by reference.

SUMMARY OF THE INVENTION

An embodiment of the present invention that is described herein provides a network adapter, including one or more network ports for communicating over a communication network, a bus interface and logic circuitry. The bus interface is configured to communicate over a bus. The logic circuitry is configured to receive bus configuration request packets from an originator, in response to at least some of the bus configuration request packets, to control the bus interface to generate one or more bus configuration cycles, and, in response to the bus configuration cycles, to generate and send bus configuration response packets to the originator of the bus configuration request packets.

In an embodiment, the logic circuitry is configured to receive the configuration request packets from the network. In another embodiment, the logic circuitry is configured to receive the configuration request packets from a local bus.

In yet another embodiment, the logic circuitry is further configured check whether a bus configuration request meets a set of requirements, to control the bus interface to generate the configuration request cycles and send a bus configuration response packet that corresponds to a result of the bus configuration cycles if the configuration request packet meets the set of requirements, and to send a failure notification when the bus configuration request packet does not meet the set of requirements.

In an embodiment, the network adapter is Peripheral Component Interconnect Express (PCIe) bus.

There is additionally provided, in accordance with an embodiment of the present invention, a method, including, in a network adapter that communicates over a communication network and comprises a bus interface for communicating over a bus, receiving bus configuration request packets from an originator. In response to at least some of the bus configuration request packets, a bus interface is controlled to generate one or more bus configuration cycles. In response to the bus configuration cycles, bus configuration response packets are generated and sent to the originator of the bus configuration request packets.

The present invention will be more fully understood from the following detailed description of the embodiments thereof, taken together with the drawings in which:

DETAILED DESCRIPTION OF EMBODIMENTS

Overview

According to embodiments of the present invention, network elements such as switches and servers may comprise a host channel adapter (HCA), and other units (e.g., a CPU). The HCA is coupled to Ingress and Egress ports of the network element and performs packet routing. Although the embodiments described herein refer mainly to HCAs, the HCA is regarded as one example of a network adapter; i.e., the unit of the network element that is connected to the network and controls ingress and egress of network packets. The disclosed techniques can be used with any suitable type of network adapter, e.g., Network Interface Controller (NIC).

In some embodiments, the HCA and the other units of the network element are coupled to each other by an internal high-speed bus. In an embodiment, the high-speed bus is PCIe. In the context of the present patent application and in the claims, the term "PCIe bus" refers to any and all versions of PCIe, including future versions.

Typically, units that are coupled to the PCIe bus each comprise a PCIe Interface unit, which governs data transfers between the HCA and other units that are coupled to the PCIe bus.

PCIe defines a configuration space for devices, wherein configuration registers are mapped to memory locations. Device drivers and diagnostic software typically need to have access to the configuration space. For example, the PCIe 4.0 specification, cited above, defines lane margining procedures in which the eye characteristics of the transmitter is tested, by accessing the configuration space. Configuration space access may be done, for example, by Application Programming Interfaces (APIs) that the operating system supports. The API translates configuration-space access requests that the user initiates, into configuration cycles.

For configuration and for diagnostics, it may be necessary to access the PCIe configuration space of the HCA of a network element from a client (e.g., a user) that is external to the network element. The user may communicate with the CPU of the network element and activate an API to access the PCIe configuration space of the HCA. However, such API (especially in non-Unix operating systems), may be complex; and the accessing of the PCIe configuration space of the HCA may be slow.

Embodiments of the present invention provide methods and apparatus for flexible and fast accessing of the PCIe configuration space of the HCA, by a remote user. The user may connect to the HCA through the network (or, in some embodiments, through a local bus) transparently to the CPU of the network element (that is—without executing any code on the CPU).

According to embodiments of the present invention, accessing of the PCIe configuration space of an HCA in a network element may be requested by a remote client over the network, using management packets such as InfiniBand™ Management Datagram (MAD), or Ethernet E-MAD. Such Management packets that initiate accesses to the PCIe configuration space of the HCA will be referred to as PCIe Configuration Access Request Packets hereinbelow.

According to embodiments of the present invention, logic circuitry in the HCA of the network element may be configured to detect PCIe Configuration Access Request Packets, verify that the request is permitted, execute corresponding PCIe configuration cycles and send the results to the client through an egress packet. The request is fulfilled transparently to the CPU of the network element, at a high speed and with no operating system support.

In alternative embodiments, PCIe transactions may be initiated by direct connection to the HCA, using, for example, an Inter-Integrated Circuit (I2C) bus.

Thus, according to embodiments of the present invention, high speed accesses to a PCIe configuration of an HCA space that are executed by the HCA with no CPU intervention may be initiated from anywhere over the network, and/or directly from a bus connected to the HCA.

System Description

Figure 1:
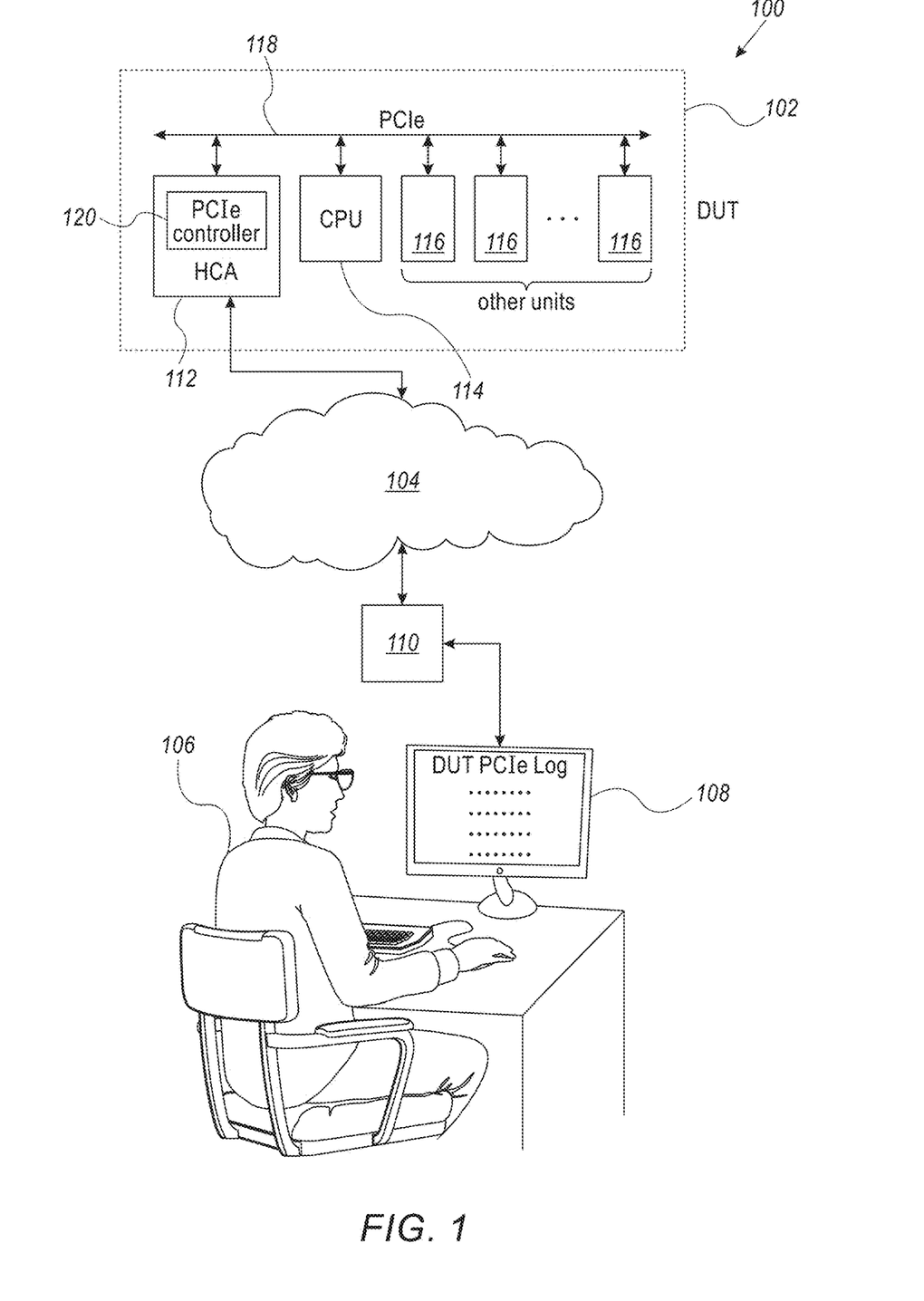
FIG. 1 is a block diagram that schematically illustrates remote accessing of the PCIe configuration space of the Host Channel Adapter (HCA) of a network element in a communication network, in accordance with embodiments of the present invention.

FIG. 1 is a block diagram 100 that schematically illustrates remote accessing of the PCIe configuration space of the HCA of a network element in a communication network, in accordance with embodiments of the present invention. A Network Element 102 (e.g., an InfiniBand switch, also referred to herein as a Device Under Test—DUT) is coupled to a network 104 (e.g., an InfiniBand network). A User 106 operates a Console 108 of a Server 110 that is coupled to network 104 (in that respect, Server 110 is considered another Network Element).

Network Element 102 comprises a Host Channel Adapter (HCA) 112 that is coupled to network 104; a CPU 114; and, other units 116. In the example embodiment of FIG. 1, all the units of Network Element 102 are inter-connected using a PCIe bus 118.

HCA 112 comprises a PCIe Controller 120, which governs PCIe bus transactions, and comprises a configuration space (typically, CPU 114 and other units 116 also comprise respective PCIe controllers, which are omitted from FIG. 1, for clarity).

User 106 wishes to access the configuration space of the PCIe controller of HCA 112 of network element 102. Software running on Server 110 translates commands that the user submits to special PCIe-configuration network packets (PCIe Configuration Access Request packets), which then transverse through the Network and arrive at DUT 102.

In the DUT, the PCIe Configuration Access Request Packets enter HCA 112. The packets are identified by the HCA, and logic circuitry (e.g., microcode) within the HCA generates the requested PCIe configuration cycles, that access the configuration space of PCIe controller 120 (the logic circuitry will be described with reference to FIG. 3 hereinbelow). The return data of the PCIe configuration cycles is then encapsulated by the HCA and sent back over network 104 to Server 110. Software in Server 110 then displays the return data to User 106.

Thus, according to the example embodiment of FIG. 1, a user can access the PCIe configuration space of an HCA from a remote network element through the network. Corresponding configuration cycles are executed by the HCA of the network element, at high speed, transparently to the CPU and with no software support.

Figure 2:
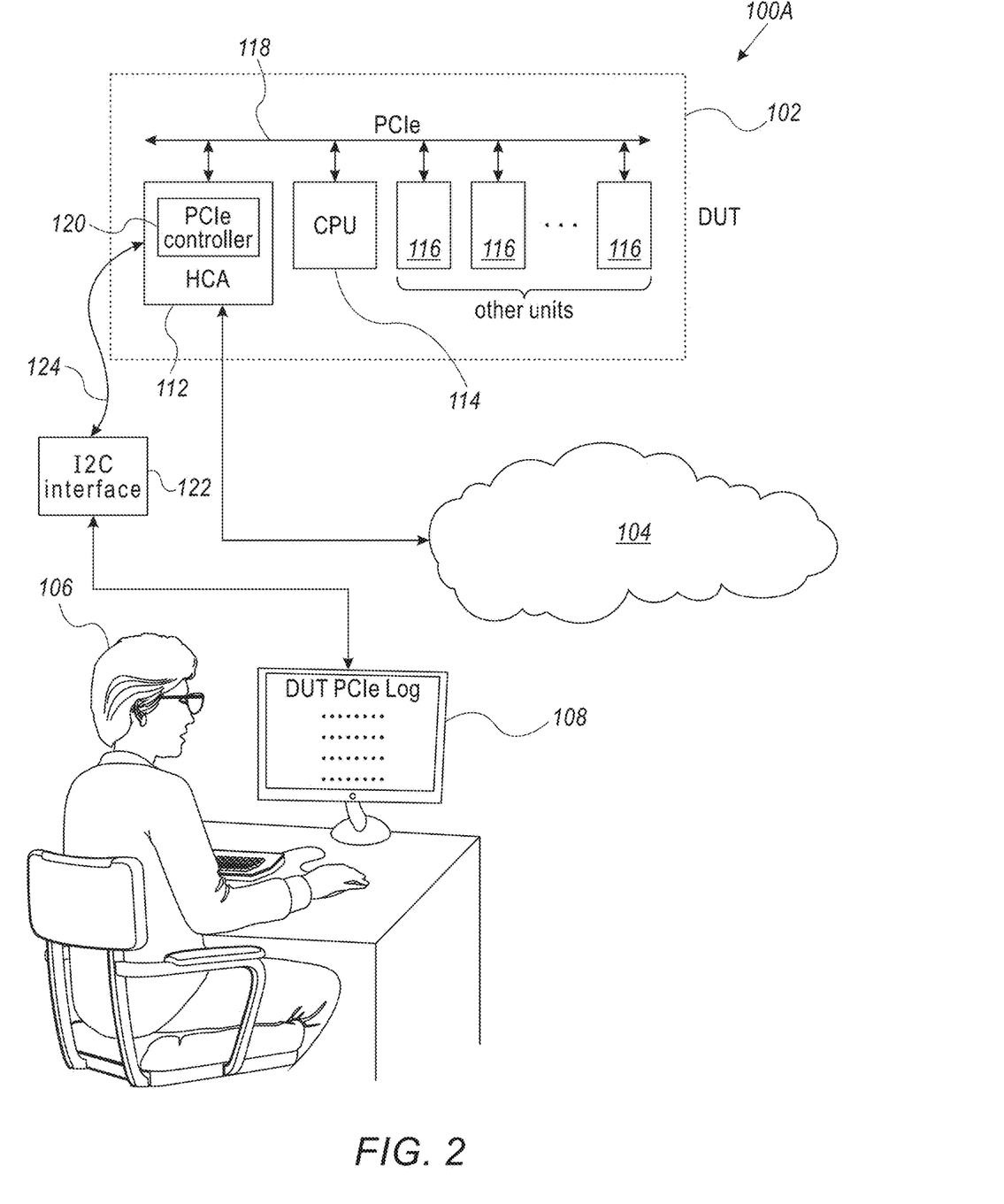
FIG. 2 is a block diagram that schematically illustrates local accessing of the PCIe configuration space of the HCA in a communication network, in accordance with embodiments of the present invention.

FIG. 2 is a block diagram 100A that schematically illustrates local accessing of the PCIe configuration space of an HCA in a communication network, in accordance with embodiments of the present invention. The embodiment illustrated in FIG. 2 is similar to the embodiment illustrated in FIG. 1, and both embodiments have the same network 104 and DUT 102. However, in the embodiment illustrated in FIG. 2, User 106 operates, through Console 108, a Processor 122, which is coupled to HCA 112 of the DUT, through local Inter-Integrated Circuit bus (I2C) 124.

When the User wishes to access the PCIe configuration space of PCIe controller 120, software running on Processor 122 translates commands that the user submits to special PCIe-configuration request I2C packets (which may be similar in structure to the PCIe Configuration Access Request Packets, described hereinabove).

In the HCA, the logic circuitry (e.g., microcode) interprets the I2C packets and generates the requested PCIe configuration cycles (the logic circuitry will be described with reference to FIG. 3 hereinbelow). The HCA then encapsulates and sends the return data of the PCIe configuration cycles, over I2C bus 124, to Processor 122. Processor 122 then extracts the return data and displays the data on console 108.

Thus, according to the example embodiment of FIG. 2, a user can access the PCIe configuration space of the HCA by interfacing directly with the HCA of the DUT, transparently to the CPU and with no software support.

As would be appreciated, network 104 and Network Element 102, described with reference to FIGS. 1 and 2 above, are cited by way of example. Networks and network elements in accordance with the disclosed techniques are not limited to the description hereinabove. For example, in alternative embodiments, Network Element 102 may comprise multiple CPUs and/or multiple buses; the network element may be an aggregation of network elements, which may be interconnected by one or more local or global networks, wired and/or wireless. In some embodiments the I2C bus coupling processor 122 to HCA 112 may be substituted by any other bus, including, for example, SPI, RS422 and parallel bus; in an embodiment the connection may be wireless, e.g. using Bluetooth.

In an embodiment, PCIe configuration space access may be initiated both by a remote user connected to the DUT through the network, and, by a local user connected to the DUT through a local bus that is coupled to the HCA. In some embodiments, the network elements may be bridges, routers, or any other device that is coupled to a network. In embodiments, the HCA may be Ethernet NIC; in other embodiments any other type of network adapter may be used.

Figure 3:
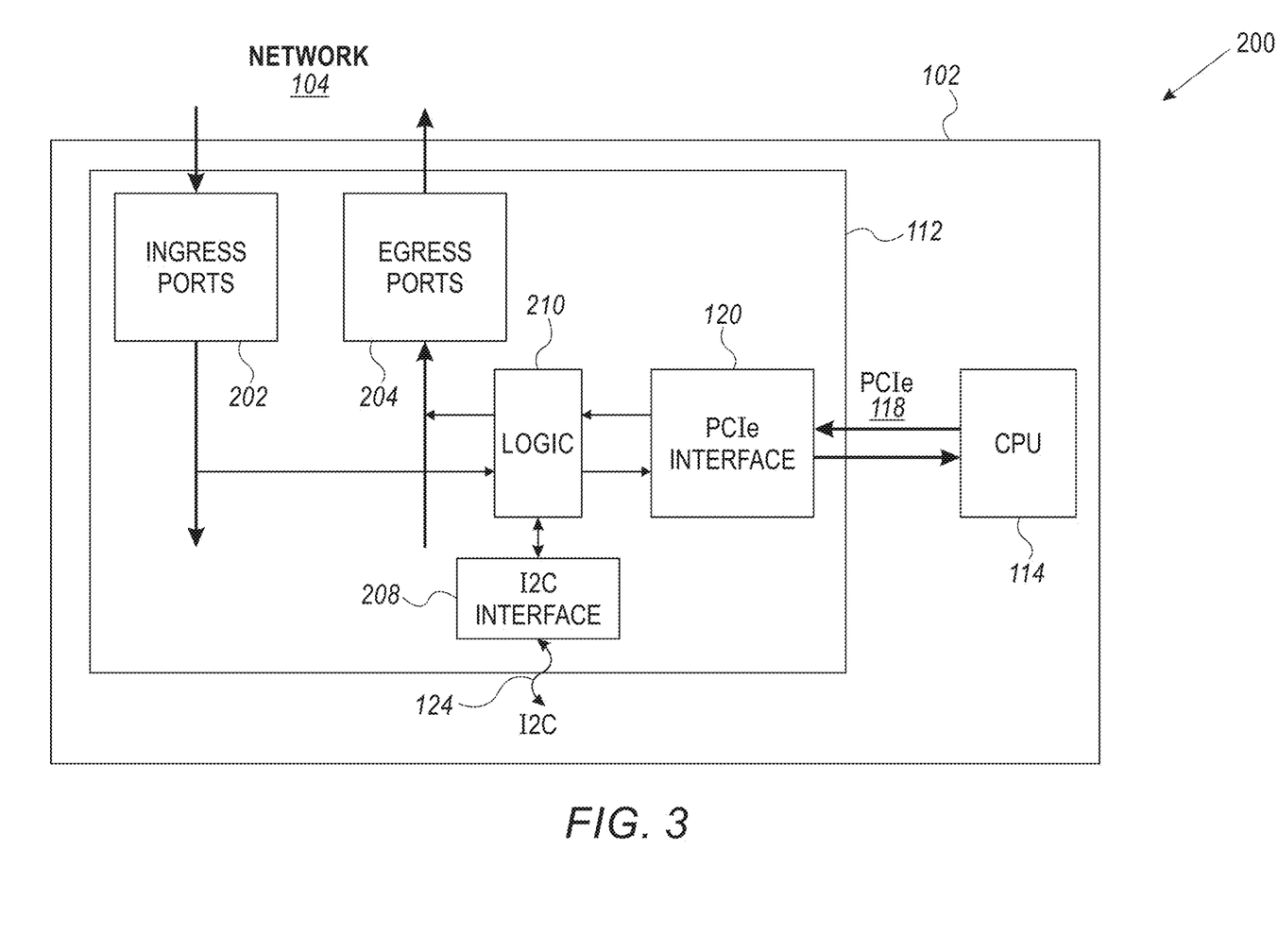
FIG. 3 is a block diagram that schematically illustrates the structure of a HCA, in accordance with an embodiment of the present invention.

FIG. 3 is a block diagram 200 that schematically illustrates the structure of a Host Channel Adapter, in accordance with an embodiment of the present invention.

DUT Network Element 102 is connected to Network 104, and comprises an HCA 112, which is coupled through a PCIe bus 118 to a CPU 114 and to other units that are not shown (Network 104, units 102, 112, 118 and 114 were described hereinabove, with respect to FIGS. 1 and 2).

HCA 112 comprises one or more Ingress Ports 202, which are configured to receive packets from Network 104; one or more Egress Ports 204, which are configured to send packets to the Network a PCIe Interface 120, which is configured to send and receive PCIe packets on PCIe bus 118, an I2C Interface 208, and, a Logic Circuitry 210 (HCA 112 may comprise other units, that are not shown).

Ingress Ports 202 receive packets, which may comprise PCIe-Configuration Request Packets, from the network. Ingress Ports 202 are coupled to Logic Circuitry 210. According to the example embodiment of FIG. 3, Logic Circuitry 210 examines the received packets. If the packets are valid PCIe Configuration Request Packets (as will be defined hereinbelow), the logic circuitry will control PCIe Interface 120 to execute respective PCIe configuration cycles, receive from the PCIe Interface the returned value of the configuration cycles, encapsulate the returned values in a PCIe Configuration Results Packet, and forward the packet to Egress Ports 204. Egress Ports 204 will then send the PCIe Configuration Results packets over the Network (typically to the requestor that initiated the PCIe-Configuration cycle).

According to the example embodiment of FIG. 3, PCIe configuration cycles may also be initiated by a local user (in accordance with the illustration depicted in FIG. 2). The local user can send PCIe Configuration-Request Packets through an I2C bus, which is coupled to I2C Interface 208. The Logic Circuitry will control the PCIe Interface to execute respective PCIe configuration cycles if the request is valid, encapsulate the returned data in a Configuration Response Packet, and send the Configuration Response Packet though the I2C interface, to the user.

Thus, according to the example embodiment of FIG. 3, users can access the PCIe configuration space of the HCA in the DUT, either from a local bus connected to the HCA of the DUT, or from the network, transparently to the CPU of the DUT, and without any software support in the DUT.

As would be appreciated, the block diagram of HCA 112 described hereinabove is cited by way of example. HCAs in accordance to the disclosed techniques are not limited to the description hereinabove. For example, the HCA can be a Network Interface Controller (NIC), the capability to request PCIe configuration cycles directly from the HCA (not from the network) can be done using other busses such as Serial Peripheral Interface (SPI), parallel bus or wireless connections such as Bluetooth. In some embodiments the accessing of the PCIe configuration space can be initiated from the network only; in other embodiments the accessing can be initiated only from an I2C (or other bus) that is connected directly to the HCA; and, in yet other embodiments, the PCIe configuration space could be initiated from a plurality of sources, including from the network and/or one or more buses that are directly connected (by wire or wirelessly) to the HCA. In some embodiments, a certain port can serve both as an ingress port and as an egress port. In an example embodiment the HCA comprises just a single port that performs all ingress and egress functionality.

Figure 4:
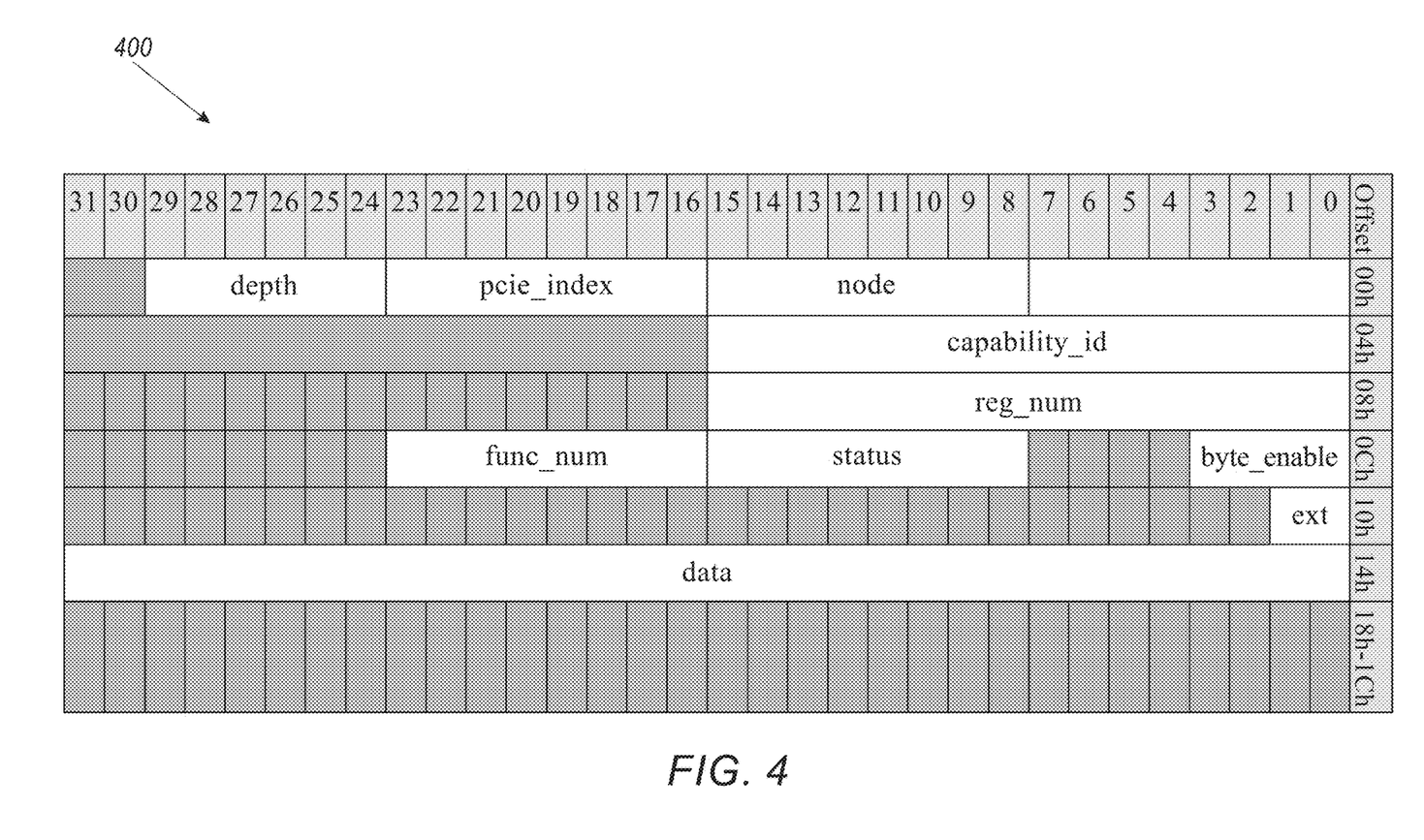
FIG. 4 is a map of bits that are encapsulated in a PCIe Configuration Access Request packet, in accordance with an embodiment of the present invention.

FIG. 4 is a map 400 of bits that are encapsulated in a PCIe Configuration Access Request Packet, in accordance with an embodiment of the present invention. The Configuration Access Request Packet comprises the following fields:

Depth: depth in hierarchy of the DUT when the PCIe is tree-structured.

Pcie_index: PCIe index per PCIe definition, when the PCIe is tree-structured

Node: PCIe endpoint number per PCIe definition, when the PCIe is tree-structured.

Capability_ID: the capability ID (in PCIe, each capability structure set also has a unique Capability_ID).

reg_num: identifies the accessed address space register.

func_num: PCIe Function Number—each PCIe function is identified by a three-digit hexadecimal function ID that is unique within a processor configuration.

status: in PCIe configuration space, Status register is used to report what features are supported and whether certain kinds of errors have occurred.

byte_enable: indication of the bytes that are written in a write operation.

ext: extended register number in the configuration space, per PCIe definition.

data: data to be written into (in case of a Write) or read from (in case of a Read) the PCIe device.

As would be appreciated, the bit map PCIe configuration request packets described hereinabove is cited by way of example. In alternative embodiments, configuration request packets may present the required configuration in a different encoding, using different bits within the packet.

Figure 5:
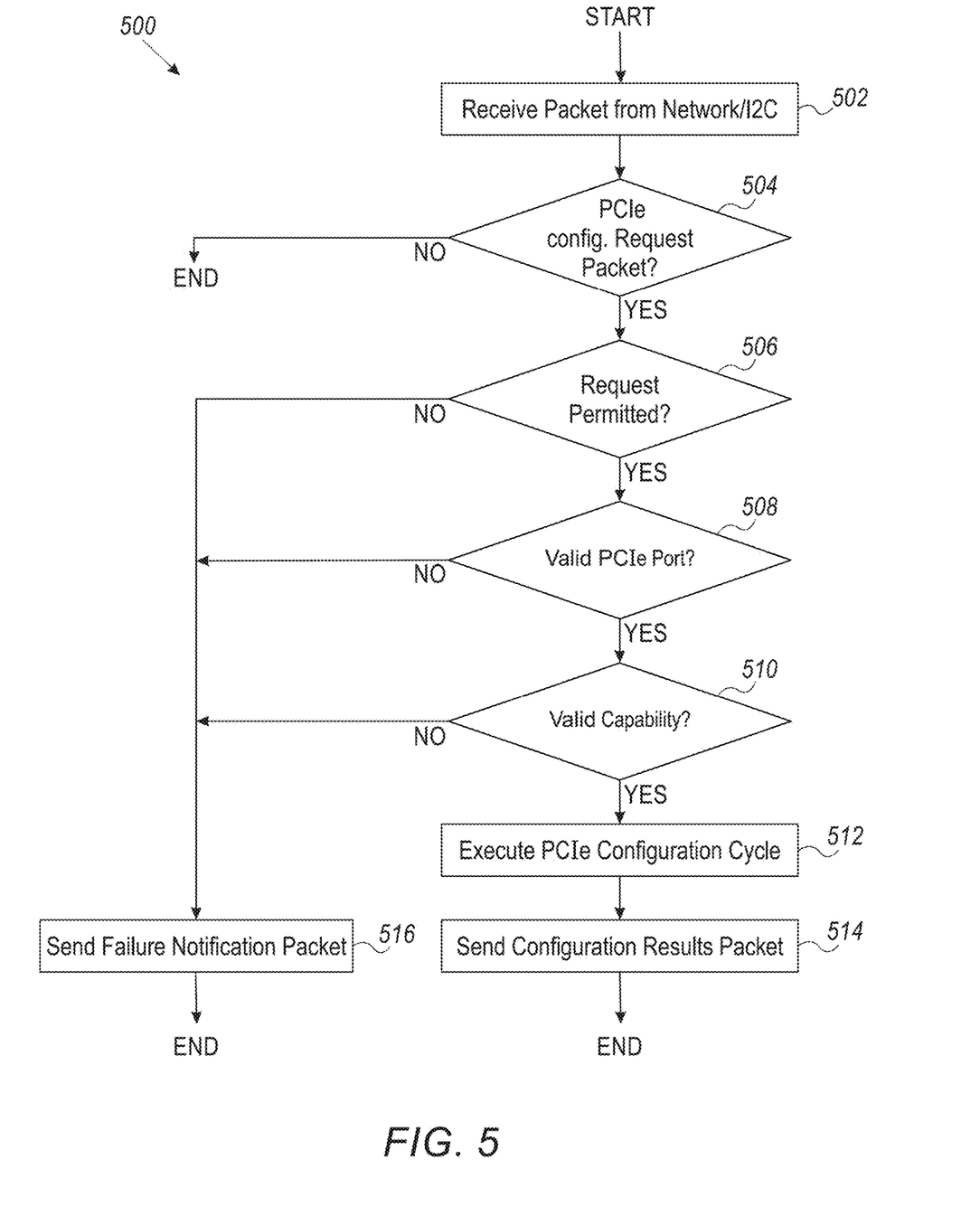
FIG. 5 is a flow chart that schematically illustrates the handling of PCIe Configuration Access Request packet by a HCA, in accordance with an embodiment of the present invention.

FIG. 5 is a flow chart 500 that schematically illustrates handling of PCIe configuration access packets by logic circuitry 210 in HCA 112, in accordance with an embodiment of the present invention.

The flow starts at a Receiving Packet step 502, wherein the Logic Circuitry receives a packet, either from the network or from an I2C interface. The Logic Circuitry then enters a Detecting PCIe Configuration Request step 504, wherein the Logic Circuitry checks the packet type, and, exits to a Checking Permission step 506 if the packet is a PCIe Configuration Request Packet. If the packet is of any other type, the flow ends.

At step 506 the Logic Circuitry checks if the request is permitted. The Logic Circuitry may be configured to selectively permit PCIe configuration space accesses; for example, based on a predefined set of network sources, or from a predefined set of ports. The check that the Logic Circuitry executes in step 506 passes if the request is permitted and fails if it is not.

If the check that the Logic Circuitry executes at step 506 passes, the Logic Circuitry will enter a Checking PCIe Port Validity step 508, wherein the Logic Circuitry checks if the PCIe port specified in the PCIe Configuration Request packet is a valid port number in the PCIe topology of the Logic Circuitry. The check of step 508 passes in case of a valid port number and fails for an invalid port number.

If the check that the Logic Circuitry executes at step 508 passes, the Logic Circuitry will enter a Checking Valid Capacity step 510, wherein the Logic Circuitry checks if the Capacity specified in the PCIe Configuration Request packet is supported by the PCIe of the Logic Circuitry. The check passes if the capacity is supported and fails if the capability is not supported.

step 510 concludes the PCIe Configuration Request packet checking that the Logic Circuitry executes, and, if the capability check of step 510 passes, the Logic Circuitry enters a PCIe Configuration Cycle step 512. If any of the checking steps 506, 508, 510 fails, the Logic Circuitry will enter a Sending Failure Notification step 516, wherein the Logic Circuitry will send a failure notification packet, typically to the requestor, and end the flow-chart.

At step 512 the Logic Circuitry accesses the PCIe configuration space, by executing a corresponding PCIe configuration cycle. The Logic Circuitry then enters a Sending Results Packet step 514, wherein the Logic Circuitry encapsulates the configuration cycle results in a Configuration Response Packet and sends the response packet, typically to the sender of the request packet. After step 514 the flow ends.

Thus, according to the example embodiment of FIG. 5, the Logic Circuitry checks the validity of a Configuration Request Packet that the Logic Circuitry receives, either from the network or locally (e.g. from an I2C interface); accesses the configuration space and sends the result to the requestor if the request is valid, or—if the request is not valid—sends a failure notification to the requestor. The operation is done at high speed, transparently to the CPU (that is—no software support is required).

As would be appreciated, the flow-chart illustrated in FIG. 5 and described hereinabove is cited by way of example. In alternative embodiments, flow-charts for handling PCIe configuration request packets are not limited to the description hereinabove. For example, the Logic Circuitry may perform other checks of the packets, or perform all checks at the same time.

Figure 6:
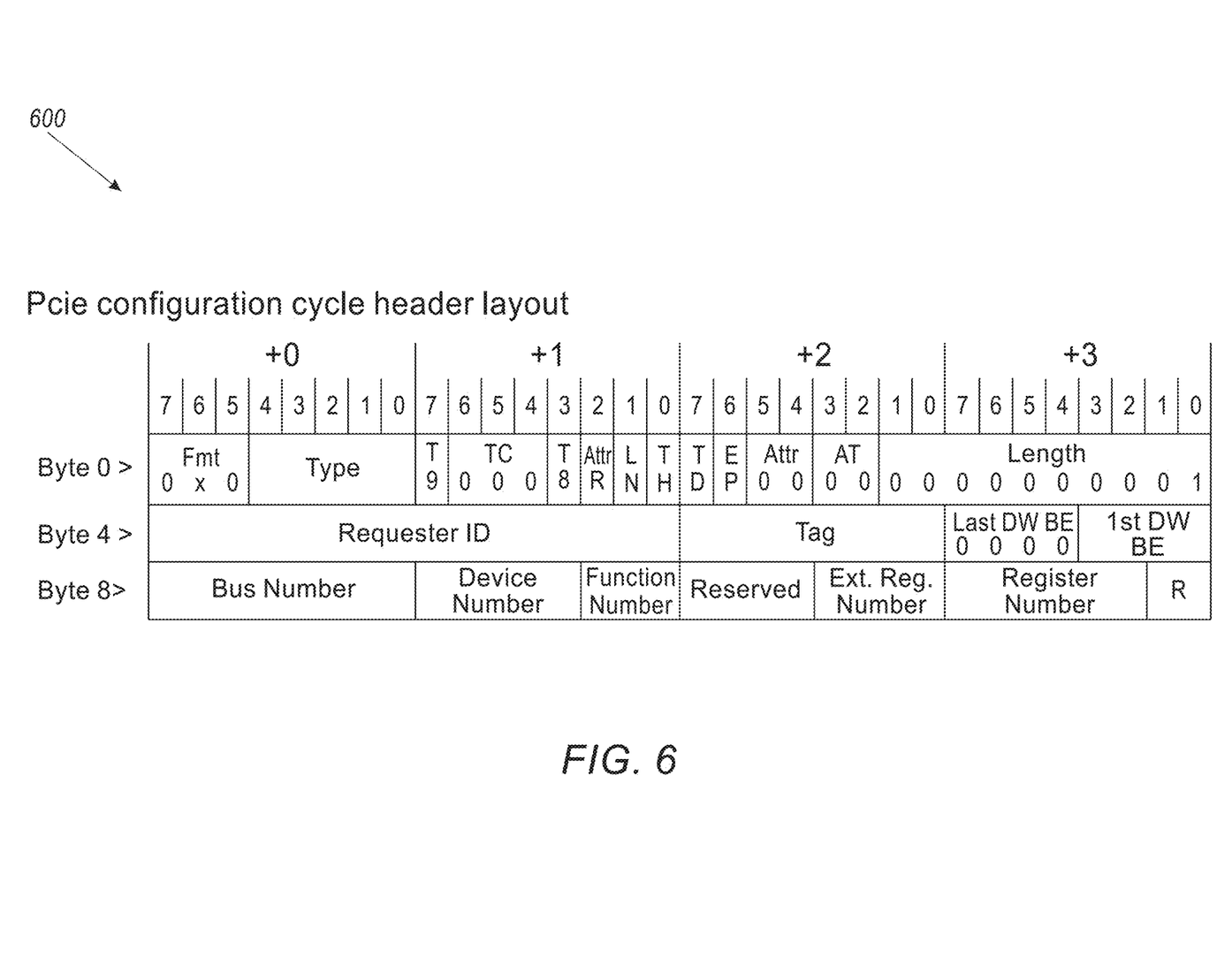
FIG. 6 is a map of bits of a PCIe configuration cycle header layout, in accordance with an embodiment of the present invention.

FIG. 6 is a map 600 of bits of a PCIe configuration cycle header layout, in accordance with an embodiment of the present invention.

The PCIe configuration cycle header of FIG. 6 is defined in PCIe Express Bus Specifications (cited above), FIG. 2.18. In response to receiving a PCIe Configuration Request Packet, that passes the checks described hereinabove with respect to FIG. 5, the Logic Circuitry Logic Circuitry generates a PCIe configuration cycle. The header of the configuration cycle comprises fields with preset value, and variable fields that the Logic Circuitry sets according to fields of the PCIe Configuration Request Packet (the various fields are defined in the cited reference and will not be reiterated).

The preset fields are: Fmt, Type, T9, TC, T8, AttrR, LN, TH, TD, EP, Attr, AT, Length, Requester ID Tag, Last DW BE, Bus Number, Device Number, Reserved, and R. According to an embodiment, the Logic Circuitry sets the value of the length field to 1 (the length of the configuration cycle, in double-words), and sets the value of all the other preset fields to 0.

The variable fields are:

$1^{st}$ DW BE: The Logic Circuitry copies the byte-enable field of the PCIe Configuration Request packet into this field.

Function Number: The Logic Circuitry copies the Func_num field of the PCIe Configuration Request packet, bits 2:0, into this field into this 3-bit field.

Ext. Reg. Number: The Logic Circuitry copies the 2-bit Ext field of the PCIe Configuration Request packet into bits 1:0 of this field, and, sets bits 3:2 of this field to binary 00.

Register Number: The Logic Circuitry copies the Register field of the PCIe Configuration Request packet, bits 5:0, into this 6-bit field.

As would be appreciated, the setting of the PCIe configuration cycles bits described hereinabove with reference to FIG. 6, is cited by way of example. Other suitable settings may be used in alternative embodiments.

The configuration of network element 102, Logic Circuitry 112, flow-chart 500 and the bit maps illustrated in FIGS. 3 and 5, are example configurations that are shown purely for the sake of conceptual clarity. Any other suitable configurations, flow-charts and bit-maps can be used in alternative embodiments.

In some embodiments network element 102 may be an aggregation of network switches.

The different elements of HCA 112, or parts thereof, e.g., logic circuitry 210, may be implemented using suitable hardware or firmware, such as in one or more Application-Specific Integrated Circuits (ASICs) or Field-Programmable Gate Arrays (FPGAs), using software, using hardware, or using a combination of hardware and software elements.

In some embodiments, Network Element 102 comprises one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
   one or more network ports for communicating over a communication network;
   a bus interface, configured to communicate over a bus; and
   logic circuitry, which is configured to:
      receive from the communication network bus configuration request packets from an originator;
      control the bus interface, in response to at least some of the bus configuration request packets, to generate one or more bus configuration cycles; and
      in response to the bus configuration cycles, generate and send bus configuration response packets to the originator of the bus configuration request packets.

2. The network adapter according to claim 1, wherein the logic circuitry is configured to receive the configuration request packets from a local bus.

3. The network adapter according to claim 1, wherein the logic circuitry is further configured to:
   check whether a bus configuration request meets a set of requirements;
   when the configuration request packet meets the set of requirements, control the bus interface to generate the configuration request cycles and send a bus configuration response packet that corresponds to a result of the bus configuration cycles; and
   when the bus configuration request packet does not meet the set of requirements, send a failure notification.

4. The network adapter according to claim 1, wherein the bus is a Peripheral Component Interconnect Express (PCIe) bus.

5. A method, comprising:
   in a network adapter that communicates over a communication network and comprises a bus interface for communicating over a bus, receiving from the communication network bus configuration request packets from an originator;

in response to at least some of the bus configuration request packets, controlling a bus interface to generate one or more bus configuration cycles; and in response to the bus configuration cycles, generating and sending bus configuration response packets to the originator of the bus configuration request packets.

6. The method according to claim 5, wherein receiving the bus configuration request packets comprises receiving the bus configuration request packets from a local bus.

7. The method according to claim 5, further comprising:

checking whether a bus configuration request meets a set of requirements;

when the configuration request packet meets the set of requirements, controlling the bus interface to generate the configuration request cycles and sending a bus configuration response packet that corresponds to a result of the bus configuration cycles; and when the bus configuration request packet does not meet the set of requirements, sending a failure notification.

8. The method according to claim 5, wherein receiving the bus configuration request packets comprises receiving Peripheral Component Interconnect Express (PCIe) configuration request packets.

\* \* \* \* \*